US009661442B2

(12) United States Patent
Huang et al.

(10) Patent No.: US 9,661,442 B2
(45) Date of Patent: May 23, 2017

(54) METHOD AND APPARATUS FOR TRANSMITTING DIGITAL CONTENTS

(75) Inventors: Fu-Yu Huang, Taipei (TW); Min-Chun Lin, Taipei (TW); Feng-Hui Kuan, Taipei (TW); Ray-I Chang, Taipei (TW); Jing-Fa Tsai, Taipei (TW); Chao-Nan Wang, Taipei (TW); Wen-Jong Wu, Taipei (TW)

(73) Assignee: Ko-Chang Hung, Taipei (TW)

( * ) Notice: Subject to any disclaimer, the term of this patent is extended or adjusted under 35 U.S.C. 154(b) by 218 days.

(21) Appl. No.: 13/355,365

(22) Filed: Jan. 20, 2012

(65) Prior Publication Data

US 2013/0108071 A1 May 2, 2013

Related U.S. Application Data

(60) Provisional application No. 61/554,061, filed on Nov. 1, 2011.

(51) Int. Cl.
*H04W 4/00* (2009.01)
*G06Q 10/10* (2012.01)

(52) U.S. Cl.
CPC ............ *H04W 4/008* (2013.01); *G06Q 10/10* (2013.01); *H04L 2209/60* (2013.01); *H04L 2209/805* (2013.01)

(58) Field of Classification Search
CPC .... H04B 11/00; H04B 7/0671; H04B 7/0817; H04B 7/0822; G06F 17/3074; H04R 25/558; H04R 3/00
USPC .............................................. 381/77; 700/94
See application file for complete search history.

(56) References Cited

U.S. PATENT DOCUMENTS

| | | | | |
|---|---|---|---|---|
| 7,974,877 | B2* | 7/2011 | Ramanathan et al. | 705/14.55 |
| 2003/0212549 | A1* | 11/2003 | Steentra | H04B 11/00 704/201 |
| 2007/0016654 | A1* | 1/2007 | Bowles | G06F 21/10 709/217 |
| 2007/0155313 | A1* | 7/2007 | Goldberg | G10H 1/0025 455/3.06 |
| 2009/0276439 | A1* | 11/2009 | Rosenblatt et al. | 707/10 |

(Continued)

FOREIGN PATENT DOCUMENTS

| | | |
|---|---|---|
| CN | 101228808 A | 7/2008 |
| CN | 102057374 A | 5/2011 |

OTHER PUBLICATIONS

Taiwan Patent Office, Office Action, Patent Application Serial No. 10140471, Mar. 20, 2015, Taiwan.

(Continued)

*Primary Examiner* — Duc Nguyen
*Assistant Examiner* — Yogeshkumar Patel

(57) ABSTRACT

The invention discloses a method for transmitting digital contents between devices. First digital contents are modulated into an audio signal in a first device, wherein the first digital contents include contact information and at least one index of at least one second digital content. The audio signal is outputted by at least one audio generator of the first device and then received by at least one audio receiver of a second device. The audio signal is demodulated in the second device to make the second device obtain the first digital contents. The second device obtains the at least one second digital content according to the at least one index of the at least one second digital contents through a wired or wireless communication.

28 Claims, 9 Drawing Sheets

(56) References Cited

U.S. PATENT DOCUMENTS

| | | | | |
|---|---|---|---|---|
| 2010/0082821 A1* | 4/2010 | Rosenblatt | ............ | G06F 15/16 709/228 |
| 2010/0250708 A1* | 9/2010 | Limberis | ............ | G06F 17/3002 709/219 |
| 2011/0312278 A1* | 12/2011 | Matsushita | ....... | H04L 12/40013 455/66.1 |

OTHER PUBLICATIONS

China Patent Office, Office Action, Patent Application Serial No. 20210431241.2, Apr. 3, 2015, China.

* cited by examiner

METHOD AND APPARATUS FOR TRANSMITTING DIGITAL CONTENTS

BACKGROUND OF THE INVENTION

Field of the Invention

The invention relates to the technology of transmitting digital contents between electronic devices.

Description of the Related Art

Present methods for passing contact information involve exchanging paper business cards. Paper business cards generally provide fundamental information such as a name, e-mail address, telephone number and title. Therefore, some useful information such as a background, appointment calendar or product catalog cannot be provided on paper business cards. Moreover, paper business cards cannot be updated immediately when ones contact information has changed.

Owing to dramatic growth of portable electronic devices with built-in cameras, there are software or applications available for business card recognition using built-in cameras to take pictures of paper business cards, recognize contact information from the pictures and store contact information in a portable electronic device. Nevertheless, paper business cards are still required, and the contact information stored in the portable electronic device still cannot be updated immediately when contact information is changed.

Additionally, some electronic devices use near field communication (NFC) technology to transmit digital contents. However, this mechanism for transmitting information only applies to devices with NFC chips.

BRIEF SUMMARY OF THE INVENTION

It is therefore a primary objective of the claimed invention to provide a method for transmitting digital contents between electronic devices, an apparatus for transmitting digital contents, an apparatus for receiving or getting digital contents, and computer program products to solve the above-mentioned problems.

According to aspects illustrated herein, a method is provided for transmitting digital contents between devices, comprising: modulating first digital contents into a first audio signal in a first device, wherein the first digital contents include first contact information and at least one index of at least one second digital content; outputting the first audio signal by at least one audio generator of the first device; receiving the first audio signal by at least one audio receiver of a second device; demodulating the first audio signal in the second device to make the second device obtain the first digital contents; and making the second device obtain the at least one second digital content according to the at least one index of the at least one second digital contents through a first wired or wireless communication.

According to aspects illustrated herein, an apparatus is provided for transmitting digital contents, comprising: a modulate unit for modulating first digital contents into an audio signal, wherein the first digital contents include contact information and at least one index of at least one second digital content; an audio unit, including at least one audio generator for outputting the audio signal; and a communication unit for transmitting the at least one second digital content to at least one receiving apparatus through a wired or wireless communication, or uploading the at least one second digital content onto a server from which at least one receiving apparatus downloads the at least one second digital content through a wired or wireless communication.

According to aspects illustrated herein, an apparatus is provided for receiving digital contents, comprising: an audio unit, including at least one audio receiver for receiving an audio signal transmitted by a transmitting apparatus; a demodulate unit for demodulating the audio signal into first digital contents, wherein the first digital contents include contact information and at least one index of at least one second digital content; and a communication unit for obtaining the at least one second digital content according to the at least one index of the at least one second digital content through a wired or wireless communication.

According to aspects illustrated herein, a computer program product embodied in a non-transitory computer readable medium is provided, wherein when the computer program product is loaded into and executed by an electronic device, the electronic device performs a method for transmitting digital contents, comprising: modulating first digital contents into an audio signal, wherein the first digital contents include contact information and at least one index of at least one second digital content; outputting the audio signal by at least one audio generator of the electronic device; and making at least one receiving electronic device obtain the at least one second digital content through a wired or wireless communication.

According to aspects illustrated herein, a computer program product embodied in a non-transitory computer readable medium is provided, wherein when the computer program product is loaded into and executed by an electronic device, the electronic device performs a method for receiving digital contents, comprising: receiving an audio signal by at least one audio receiver of the electronic device; demodulating the audio signal into first digital contents, wherein the first digital contents include contact information and at least one index of at least one second digital content; and obtaining the at least one second digital content according to the at least one index of the at least one second digital content through a wired or wireless communication.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description recites exemplary embodiments of carrying out the invention. This description is made for the purpose of illustrating the general principles of the invention and should not be taken in a limiting sense. The scope of the invention is best determined by reference to the appended claims.

1 Device

Figure 1:
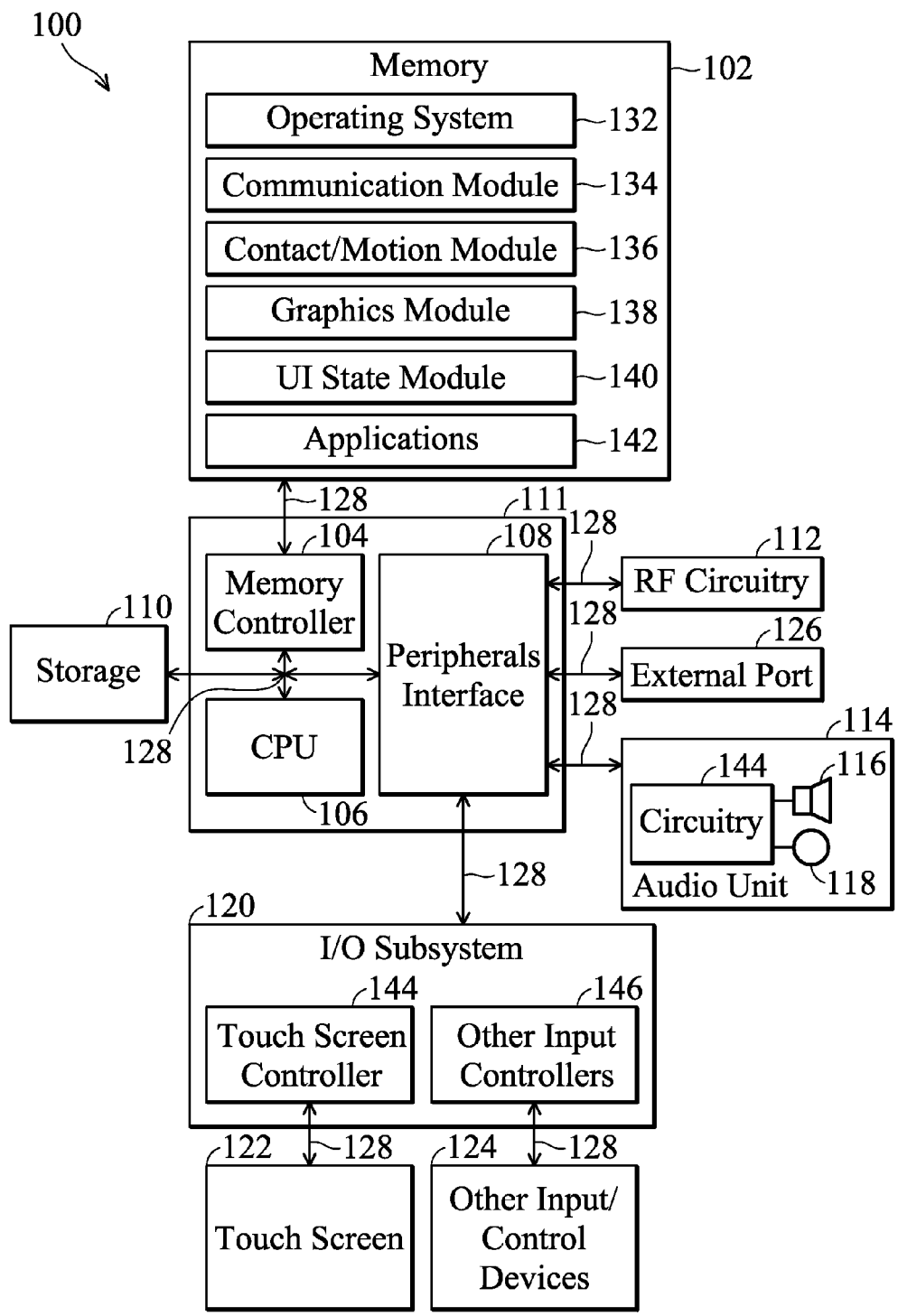
FIG. 1 illustrates a simplified block diagram of a portable electronic device in accordance with one embodiment.

FIG. 1 illustrates a simplified block diagram of a portable electronic device 100 according to some embodiments of the invention. Note, the invention is not limited to a portable electronic device. The invention may be applied to a computer, a television or any device with an audio unit. The portable electronic device 100 includes a memory 102, a memory controller 104, a central processing unit (CPU) 106, a peripherals interface 108, a storage 110, a radio frequency (RF) circuitry 112, an audio unit 114, an input/output (I/O) subsystem 120, a touch screen 122, other input or control devices 124, and an external port 126. These components communicate over one or more communication buses or signal lines 128. The portable electronic device 100 can be any portable electronic device, including but not limited to a handheld computer, a tablet computer, a mobile phone, a media player, a personal digital assistant (PDA), electronics at the point of sale (EPOS or POS), or the like, including a combination of two or more of these items. It should be appreciated that the portable electronic device 100 is only one example of a portable electronic device, and that the portable electronic device 100 may have more or fewer components than shown, or a different configuration of components. The various components shown in FIG. 1 may be implemented in hardware, software or a combination of hardware and software, including one or more signal processing and/or application specific integrated circuits.

The operation of the portable electronic device 100 is controlled by the CPU 106, which provides the processing capability required to execute an operating system, programs, user graphic interface (GUI), software, modules, application, and other functions of the portable electronic device 100. The CPU 106 may include a single processor or it may include a plurality of processors. For example, the CPU 106 may include general purpose microprocessors, a combination of general and special purpose microprocessors, such as instruction-set processors, graphics processors, video processors, audio processors and special purpose microprocessors, and/or related chips sets.

Information used by the CPU 106 may be located within the long-term storage 110. The storage 110 is used to store data required for the operation of the CPU 106 as well as other data required by the portable electronic device 100. The storage 110 may stores image data, media files (e.g., music and video files), preference information (e.g., media playback preferences), wireless connection information (e.g., information that may enable the portable electronic device 100 to establish a wireless connection, such as a telephone connection), subscription information (e.g., information that maintains a record of podcasts, television shows or other media to which a user subscribes), telephone information (e.g., telephone numbers), and any other suitable data. The storage 110 may be non-volatile memory such as read only memory, flash memory, a hard drive, or any other suitable optical, magnetic, or solid-state computer readable media, as well as a combination thereof.

The memory 102 may include high speed random access memory (RAM) and may also include non-volatile memory, such as one or more magnetic disk storage devices, flash memory devices, or other non-volatile solid state memory devices (SSD). In some embodiments, the memory 102 may further include storage remotely located from the CPU 106, for instance, a network attached storage accessed via the RF circuitry 112 or the external port 126 and a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the portable electronic device 100, such as the CPU 106 and the peripherals interface 108, may be controlled by the memory controller 104. Various software programs and/or sets of instructions stored in the memory 102 are run by the CPU 106 to perform various functions for the portable electronic device 100 and to process data stored in the storage 110.

The peripherals interface 108 couples the input and output peripherals of the device to the CPU 106 and the memory 102. In some embodiments, the peripherals interface 108, the CPU 106, and the memory controller 104 may be implemented on a single chip, such as a chip 111. In some other embodiments, they may be implemented on separate chips.

The audio unit 114 may comprises a circuitry 144 for processing audio data, an audio generator 116, such as a speaker, and an audio receiver 118, such as a microphone. The number of the audio generator 116 may be more than one, and the number of the audio receiver 118 may be more than one. The circuitry 144 receives audio data from the peripherals interface 108, converts audio data to electrical signals, and transmits the electrical signals to the audio generator 116. The audio generator 116 converts the electrical signals to sound waves. The circuitry 144 also receives electrical signals converted by the audio receiver 118 from sound waves. The circuitry 144 converts the electrical signal to audio data and transmits the audio data to the peripherals interface 108 for processing. Audio data may be retrieved from and/or transmitted to the memory 102, storage 110 and/or the RF circuitry 112 by the peripherals interface 108.

The I/O subsystem 120 provides the interface between input/output peripherals on the portable electronic device 100. The I/O subsystem 120 includes a touch-screen controller 144 and one or more input controllers 146 for other input or control devices. The one or more input controllers 146 receive/send electrical signals from/to other input or control devices 124. The other input/control devices 124 may include physical buttons (e.g., push buttons, rocker buttons, etc.), dials, slider switches, sticks, and so forth.

The touch screen 122 provides both an output interface and an input interface between the device and a user. The touch screen 112 is configured to receive input from a users or object's touch and to send the information to the CPU 106, which interprets the touch event and performs a corresponding action. The touch-screen controller 144 receives/sends electrical signals from/to the touch screen 122. The touch screen 122 displays visual output to the user. The visual output may include text, graphics, video, and any combination thereof. Some or all of the visual output may correspond to user-interface objects, and further details are described below. The touch screen 122 may employ any suitable type of touch screen technology such as resistive, capacitive, infrared, surface acoustic wave, electromagnetic, or near field imaging technology. Furthermore, the touch screen 122 may employ single point or multipoint sensing. The touch screen 122 also accepts input from the user based on haptic and/or tactile contact. The touch screen 122 forms a touch-sensitive surface that accepts user input. The touch screen 122 and the touch screen controller 144 (along with any associated modules and/or sets of instructions in the memory 102) detects contact (and any movement or break of the contact) on the touch screen 122 and converts the detected contact into an interaction with user-interface objects, such as one or more soft keys, that are displayed on the touch screen. In an exemplary embodiment, a point of contact between the touch screen 122 and the user corresponds to one or more digits of the user. The touch screen 122 may use LCD (liquid crystal display) technology, or LPD (light emitting polymer display) technology, although other display technologies may be used in other embodiments. The touch screen 122 and touch screen controller 144 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 122. However, the touch screen 122 displays visual output from the portable device, whereas touch sensitive tablets do not provide visual output. The touch screen 122 may have a resolution in excess of 100 dpi. In an exemplary embodiment, the touch screen 122 may have a resolution of approximately 168 dpi. The user may make contact with the touch screen 122 using any suitable object or appendage, such as a stylus, finger, and so forth. In some embodiments, in addition to the touch screen, the portable electronic device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 122 or an extension of the touch-sensitive surface formed by the touch screen 122. The touch screen 122 is only an example of a screen. The touch screen 122 may be replaced by any type of screens.

The operating system 132 (e.g., Darwin, RTXC, LINUX, UNIX, OS X, WINDOWS, or an embedded operating system such as VxWorks, or mobile devices/portable device operating system such as Apple's iOS, Google's Android, Nokia's SYMBIAN, HP's webOS RIM's BLACKBERRY OS, Samsung's BADA, Microsoft's MEEGO, Qualcomm's BREW and the open source OS like Linux) stored in the memory 102 includes various software components and/or drivers for controlling and managing general system tasks (e.g., memory management, storage device control, power management, etc.) and facilitates communication between various hardware and software components. In some embodiments, the software components include an operating system 132, a communication module (or set of instructions) 134, a contact/motion module (or set of instructions) 136, a graphics module (or set of instructions) 138, a user interface state module (or set of instructions) 140, and one or more applications (or set of instructions) 142.

The communication module 134 facilitates communication with other devices over one or more external ports 126 and also includes various software components for handling data received by the RF circuitry 112 and/or the external port 126. The external port 126 (e.g., Universal Serial Bus (USB), FIREWIRE, etc.) is adapted for coupling directly to other devices or indirectly over a network (e.g., the Internet, wireless LAN, etc.). The communication module 134 may provide additional connectivity channels for receiving and transmitting information. The communication module 134 may represent, for example, one or more network interface cards (NIC) or a network controller as well as associated communication protocols. The communication module 134 may include several types of interfaces, including but not limited to, a wireless local area network (WLAN) interface, an unstructured supplementary service data (USSD) interface, a personal area network (PAN) interface, a local area network (LAN) interface, a wide area network (WAN) interface, a short message service (SMS) interface, a Long Term Evolution (LTE) interface, a Worldwide Interoperability for Microwave Access (WiMAX) interface, a BLUETOOTH interface, and the NFC device.

The PAN interface may provide capabilities to network with, for example, a Bluetooth, RTM, network, an IEEE 802.15.4 (e.g., ZigBee) network, or an ultra wideband network (UWB). As should be appreciated, the networks accessed by the PAN interface may, but do not necessarily, represent low power, low bandwidth, or close range wireless connections. The PAN interface may permit one electronic device 10 to connect to another local electronic device, such as a computer or portable media player, via an ad-hoc or peer-to-peer connection. However, the connection may be disrupted if the separation between the two electronic devices exceeds the range of the PAN interface.

The LAN interface and WLAN interface may provide longer-range communication channels, generally exceeding the range available via the PAN interface 64. The LAN interface may represent an interface to a wired Ethernet-based network, and the WLAN interface may represent an interface to a wireless LAN, such as an IEEE 802.11x wireless network. Additionally, in many cases, a connection between two electronic devices via the LAN interface may involve communication through a network router or other intermediary device.

Connection to a wide area network (WAN) may be provided through the WAN interface. The WAN interface may permit a connection to a cellular data network, such as the Enhanced Data rates for GSM Evolution (EDGE) network or the 3G network. When connected via the WAN interface, the portable electronic device 100 may remain connected to the Internet and, in some embodiments, to another electronic device, despite changes in location that might otherwise disrupt connectivity via the PAN interface or the LAN interface.

In certain embodiments, the portable electronic device 100 may use a device identification networking protocol to establish a connection with an external device through a network interface. For example, both the portable electronic device 100 and the external device may broadcast identification information using Internet protocol (IP). The devices may then use the identification information to establish a network connection, such as a PAN connection or a LAN connection, between the devices.

The contact/motion module 136 detects contact with the touch screen 122, in conjunction with the touch screen controller 144. The contact/motion module 136 includes various software components for performing various operations related to detection of a contact with the touch screen 122, such as determining if contact has occurred, determining if there is movement of the contact and tracking the movement across the touch screen, and determining if the contact has been broken (i.e., if the contact has ceased). Determining movement of the point of contact may include determining a speed (magnitude), velocity (magnitude and direction), and/or an acceleration (including magnitude and/or direction) of the point of contact. In some embodiments, the contact/motion module 136 and the touch screen controller 144 also detects a contact on the touchpad.

The graphics module 138 includes various known software components for rendering and displaying graphics on the touch screen 122. Note that the term "graphics" includes any object that can be displayed to a user, including without limitation text, web pages, icons (such as user-interface objects including soft keys), digital images, videos, animations and the like.

The user interface state module 140 controls the user interface state of the portable electronic device 100.

The applications 142 can include any applications installed on the portable electronic device 100, including without limitation, a browser, address book, contact list, email, instant messaging, word processing, keyboard emulation, widgets, JAVA-enabled applications, object-C applications, C++ base applications, encryption, digital rights management, voice recognition, voice replication, location determination capability (such as that provided by the global positioning system (GPS)), and a music player (which plays back recorded music stored in one or more files, such as MP3 or AAC files), etc.

The RF circuitry 112 receives and sends electromagnetic waves. The RF circuitry 112 converts electrical signals to/from electromagnetic waves and communicates with communications networks and other communications devices via the electromagnetic waves. The RF circuitry 112 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 112 may communicate with the networks, such as the Internet, which is also referred to as the World Wide Web (WWW), an Intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

2 User Operating Situation

Figure 2:
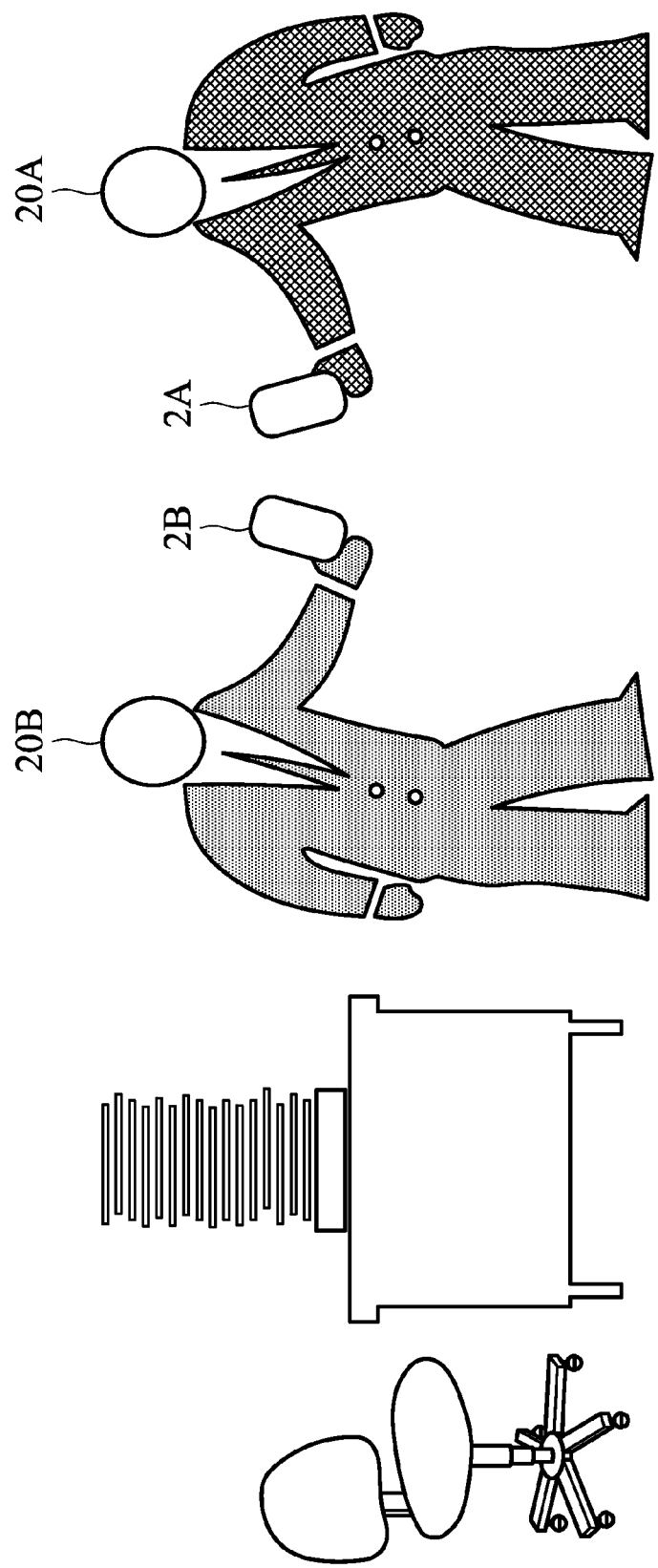
FIG. 2 illustrates a diagram of transmitting digital content between two electronic devices.

FIG. 2 illustrates a situation of transmitting digital contents between a first device 2A and a second device 2B. Transmitting of the digital contents may be performed in a wide variety of environments, such as within a store, within a school, within or home, in a vehicle, on a street or within any environment that the first device 2A may be located within or transported to.

As shown in FIG. 2, a user 20A is operating the first device 2A within an office and has encountered another user 20B operating the second device 2B. The user 20A and the user 20B may bring their respective electronic devices 2A and 2B in close proximity to each other to establish a first communication link for transmitting first digital contents like contact information and indexes of second digital contents, and then establish a second communication link for transmitting or getting second digital contents.

For example, the user 20A may wish to transmit his/her personal contact information, such as information relating to a digital business card, to the user 20B through the first device 2A. The user 20A may select an application icon on first device 2A to initiate a series of actions that may include, for example, sending the user 20A's personal contact information, information relating to a digital business card, and/or second digital contents, such as a photograph, a video file, an audio file, other multimedia files or any combination thereof, to the second device 2B. Upon completion of the work flow described above, the second device 2B may have the user 20A's personal contact information, information relating to the digital business card and/or second digital contents. The transmitting mechanism will be described in detail later.

In another example, the user 20A and the user 20B may wish to exchange their personal contact information, like information relating to a digital business card, through their respective electronic devices 2A and 2B. The user 20A may select an application icon on the first device 2A to initiate a series of actions that may include, for example, sending the user 20A's personal contact information, information relating to a digital business card and/or second digital contents to the second device 2B, and receiving the user 20B's personal contact information, information relating to a digital business card and/or second digital contents from the second device 2B. Upon completion of the work flow, the first device 2A may have the user 20B's personal contact information, information relating to a digital business card and/or second digital contents, and the second device 2B may have the user 20A's personal contact information, information relating to a digital business card and/or second digital contents. The transmitting mechanism will be described in detail later.

It should be appreciated that each one of the first device 2A and the second device 2B can be any electronic device with an audio unit, such as the portable electronic device 100 in FIG. 1, including but not limited to a handheld computer, a tablet computer, a mobile phone, a media player, a personal digital assistant (PDA), electronics at the point of sale (EPOS or POS), or the like, including a combination of two or more of these items.

3 Transmitting Mechanism

Figure 3:
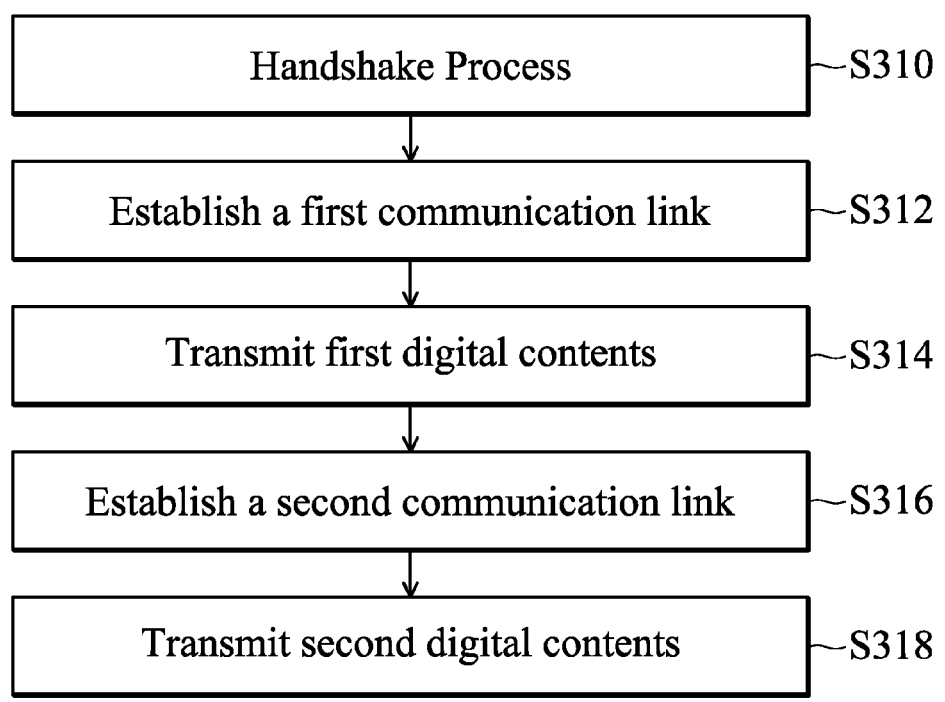
FIG. 3 illustrates a procedure for transmitting digital contents between devices.

FIG. 3 illustrates a procedure for transmitting digital contents between the first device 2A and the second device 2B. The digital contents comprise first digital contents and second digital contents. The first digital contents are transmitted or exchanged by audio units of the first device 2A and the second device 2B. The second digital contents are transmitted, exchanged or downloaded by a communication unit. In step S310, a handshake process is performed. Handshake information is transferred between the first device 2A and the second device 2B to establish a master/slave relationship. The master device that may function to control a workflow after the handshake process and send instructions for executing the workflow to the slave device. The master device may generate instructions for the workflow based on properties received from the slave device. The instructions generated by the master device may allow both devices to accomplish a shared goal, such as exchanging contact information. The handshake information may include properties such as device identifiers and connectivity information that may be used to connect the devices. For example, the handshake information may represent a short range communication link established between an audio unit of the first device 2A and an audio unit of the second device 2B. Note, the master/slave relationship is not limited to be established by the handshake process. The master/slave relationship may be determined according to a predefined definition, environment conditions or instruction inputted by users through GUI.

In this example, the first device 2A may exist in an active mode, and emit a ping message by the audio unit of the first device 2A to find devices within its range. In response to receiving the ping message, the second device 2B may respond with an acknowledgment message by the audio unit of the second device 2B. The acknowledgment message may occur while the second device 2B is in a passive mode to receive data between the devices. The ping message and the acknowledgment message are continuous audio signals or combinations of audio signals.

In some embodiments, the handshake information may include a device identifier in addition to the ping and acknowledgment messages. For example, the second device 2B may transmit a device identifier, such as a device identification number, serial number, or user's name, that may be recognized by the first device 2A to initiate the procedure.

After the handshake process is performed, in step S312, the first communication link is established between the audio unit of the first device 2A and the audio unit of the second device 2B. Then in step S314, the first device 2A transmits first digital contents to the second device 2B by the audio unit of the first device 2A and the second device 2B receive the first digital contents by the audio unit of the second device 2B. The first digital contents may include contact information, indexes of second digital contents, network properties or any combination thereof. An index may correspond to at least one second digital content. A second digital content may have one or more than one index.

The network properties may be used by the first device 2A to determine a second communication link for transmitting the second digital contents. In some embodiments, the second communication link is capable of faster data transfer rates than the first communication link. The network properties may denote networks accessible by the second device 2B and denote configuration information for connection to the networks. Among other things, the network properties may include known authorization keys, passwords, channels, connecting information of servers, service set identifiers (SSID) or any combination thereof. The network properties also may identify the network to which the second device is currently connected.

In step S316, the second communication link is established between the first device 2A and the second device 2B according to the network properties. After the second communication link is established, in step S318, the first device 2A may transmit the second digital contents to the second device 2B through the second communication link, such as wifi, direct-wifi, Bluetooth, WAN, LAN, WLAN, LTE, or WiMAX. The second digital contents may include images, detailed contact information, video files, audio files, other multimedia files, catalogs, appointment information, other types of data/files, and instructions to implement some actions, such as displaying, storing or printing the data/files, or any combination thereof.

In another example, the first device 2A uploads the second digital contents onto a server first. Then a handshake process as described above is performed to establish the first communication link between the audio unit of the first device 2A and the audio unit of the second device 2B. After the first communication link is established, the first digital contents are transmitted by the audio unit of the first device 2A and received by the audio unit of the second device 2B. Then a second communication link is established between the second device 2B and the server according to network properties. The second device 2B downloads the second digital contents from the server according to the indexes of the second digital contents through the second communication link, such as a wifi, direct-wifi, Bluetooth, WAN, LAN or WLAN, LTE, or WiMAX.

Figure 4:
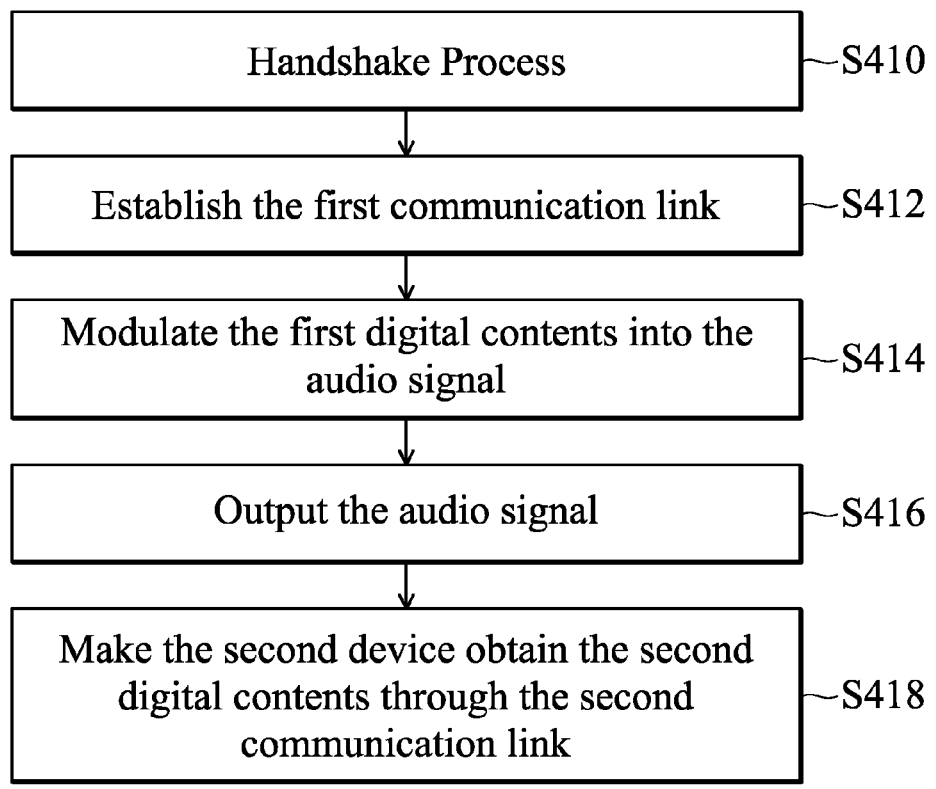
FIG. 4 illustrates a flowchart of a first device.

FIG. 4 illustrates a flowchart of the first device 2A. In step S410, the handshake process is performed. The first device 2A modulates handshake information into handshake signals and then outputs the handshake signals by the audio unit of the first device 2A to find the second device 2B. The handshake information may include properties such as device identifiers and connectivity information that may be used to connect devices. For example, the first device 2A emits a ping message by the audio unit of the first device 2A to find devices within its range. When receiving an acknowledgment message in respond to the ping message emitted by the audio unit of the second device 2B, the first device 2A establishes a master/slave relationship with the second device 2B. After the master/slave relationship has been established, in step S412, the first communication link is established between the audio unit of the first device 2A and the audio unit of the second device 2B. In step S414, the first device 2A modulates the first digital contents into the audio signal. In step S416, the first device 2A outputs the audio signal to the second device 2B by the audio unit of the first device 2A. The network properties included in the first digital contents may relate to a link key and/or password to connecting to the first device 2A or a server. For example, the link key is an identification key to a Bluetooth device, a wireless network or a wired network. In step S418, the first device 2A makes the second device 2B obtain the second digital contents through the second communication link. In one example, the second device 2B uses the network properties to establish the second communication link with the first device 2A, and then the first device 2A transmits the second digital contents directly to the second device 2B through the second communication link. In another example, the first device 2A transmits the second digital contents to the server first, then the second device 2B uses the network properties to establish the second communication link with the server, and then the second device 2B downloads the second digital contents from the server through the second communication link.

Figure 5:
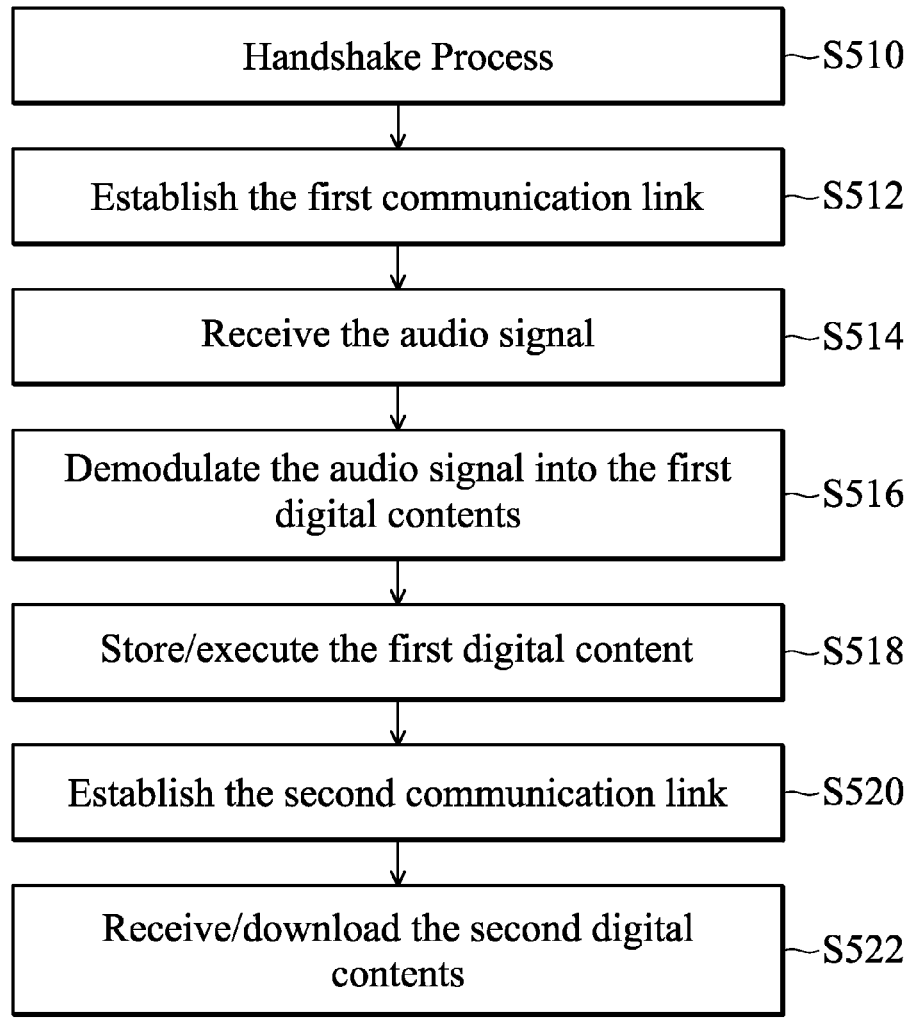
FIG. 5 illustrates a flowchart of a second device.

FIG. 5 illustrates a flowchart of the second device 2B. In step S510, the handshake process is performed. The second device 2B modulates handshake information into handshake signals and then outputs the handshake signals by the audio unit of the second device 2B. For example, when receiving the ping message by the audio unit of the second device 2B, the second device 2B emits the acknowledgment message in response to the ping message by the audio unit of the second device 2B to the first device 2A. When receiving the acknowledgment message, the first device 2A establishes the master/slave relationship with the second device 2B. After the master/slave relationship has been established, in step S512, the first communication link is established between the audio unit of the first device 2A and the audio unit of the second device 2B. In step S514, the second device 2B receives the audio signal by the audio unit of the second device 2B from the first device 2A. In step S516, the second device 2B demodulates the audio signal into the first digital contents. In step S518, the second device 2B stores or executes the first digital contents. In step S520, the second communication link is established between the second device 2B and the first device 2A or between the second device 2B and the server according to the network properties. In step S522, the second device 2B receives second digital contents from the first device 2A or downloads the second digital contents from the server according to indexes of the second digital contents through the second communication link.

Users of the first device 2A and the second device 2B can construct accounts on a website, an application, or a software providing services for managing received digital contents. When users login their account, the users can update their received digital contents into their own database located remotely from the device.

3.1 First Embodiment

Figure 6:
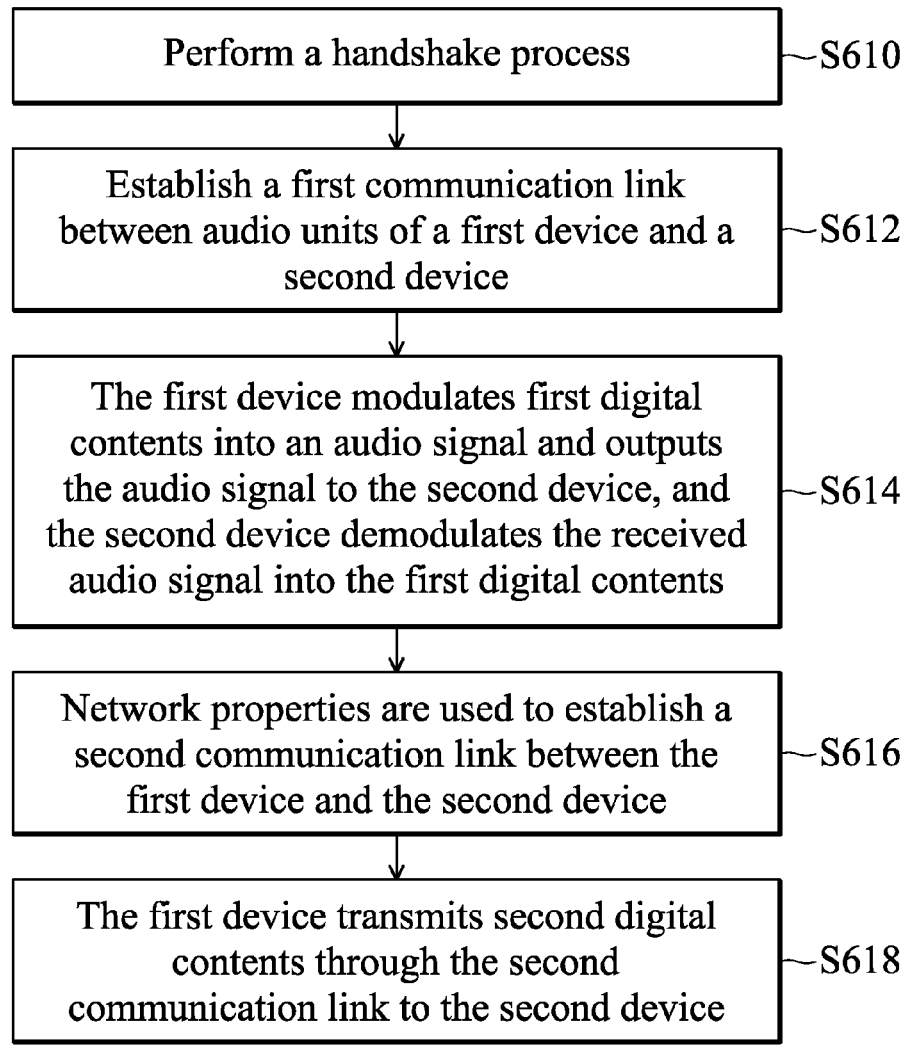
FIG. 6 illustrates a flowchart of transmitting digital contents between devices.

FIG. 6 illustrates a flowchart of transmitting digital contents between devices. In step S610, a handshake process is performed between two devices. Handshake information is transferred between the devices to establish a master/slave relationship. During the handshake process, one of the devices is determined as a master device and the other device is determined as a slave device. In this embodiment, a first device is determined as the master device and a second device is determined as the slave device. The handshake information may include properties such as device identifiers and connectivity information that may be used to connect the devices. After the handshake process is performed, in step S612, a first communication link is established between an audio unit of the first device and an audio unit of the second device.

In step S614, the first device modulates first digital contents into an audio signal and outputs the audio signal by at least one audio generator, such as a speaker, of the audio unit of the first device. The audio signal may be a continuous audio signal or combinations of audio signals. A range of frequencies of the audio signal may be out of the hearing range of humans. The at least one audio generator may output the audio signal alone or with an audio file, such as a song. The audio signal is received by at least one audio receiver, such as a microphone, of the audio unit of the second device. The second device demodulates the received audio signal into the first digital contents.

In step S616, network properties included in the first digital contents are used to establish a second communication link between the first device and the second device. In step S618, the first device transmits second digital contents through the second communication link to the second device. The second digital contents received by the second device may be further executed or/and processed. After receiving the second digital content, the second device performs a check action to compare the second digital content with data stored in the second device so as to add or update new data into corresponding database.

3.2 Second Embodiment

Figure 7:
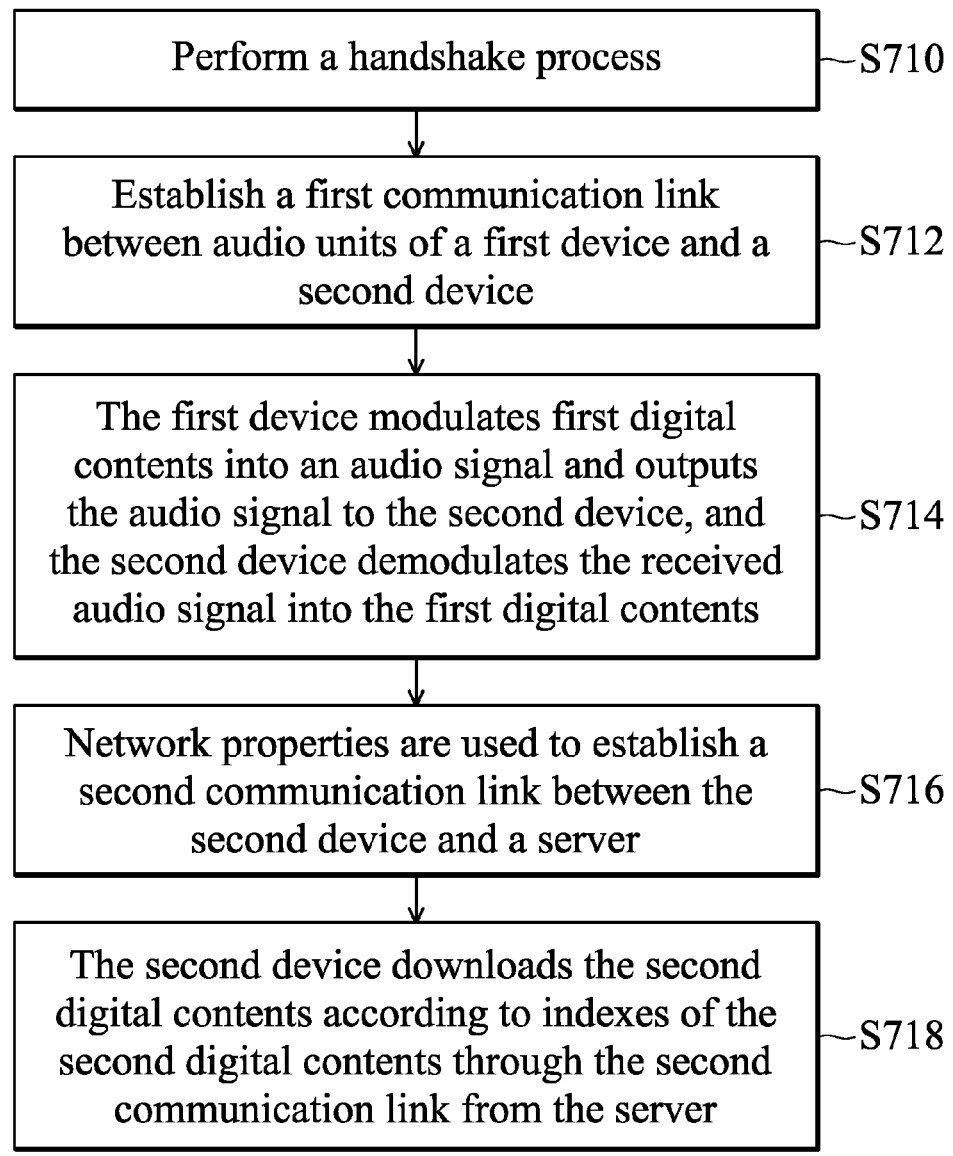
FIG. 7 illustrates a flowchart of transmitting digital contents.

FIG. 7 illustrates a flowchart of transmitting digital contents. In step S710, a handshake process is performed between two devices. Handshake information is transferred between the devices to establish a master/slave relationship. During the handshake process, one of the devices is determined as a master device and the other device is determined as a slave device. In this embodiment, a first device is determined as the master device and a second device is determined as the slave device. The handshake information may include properties such as device identifiers and connectivity information that may be used to connect the devices. After the handshake process is performed, in step S712, a first communication link is established between an audio unit of the first device and an audio unit of the second device.

In step S714, the first device modulates first digital contents into an audio signal and outputs the audio signal by at least one audio generator, such as a speaker, of the audio unit of the first device. The audio signal may be a continuous audio signal or combinations of audio signals. A range of frequencies of the audio signal may be out of the hearing range of humans. The at least one audio generator may output the audio signal alone or with an audio file, such as a song. The audio signal is received by at least one audio receiver, such as a microphone, of the audio unit of the second device. The second device demodulates the received audio signal into the first digital contents.

In step S716, network properties included in the first digital contents are used to establish a second communication link between the second device and a server, onto which the first device uploads the second digital contents. Then in step S718, the second device downloads the second digital contents according to indexes of the second digital contents through the second communication link from the server. The indexes of the second digital contents are included in the first digital contents. The second digital contents received by the second device may be further stored, executed or/and processed. After receiving the second digital content, the second device performs a check action to compare the second digital content with data stored in the second device so as to add or update new data into corresponding database.

3.3 Third Embodiment

Figure 8:
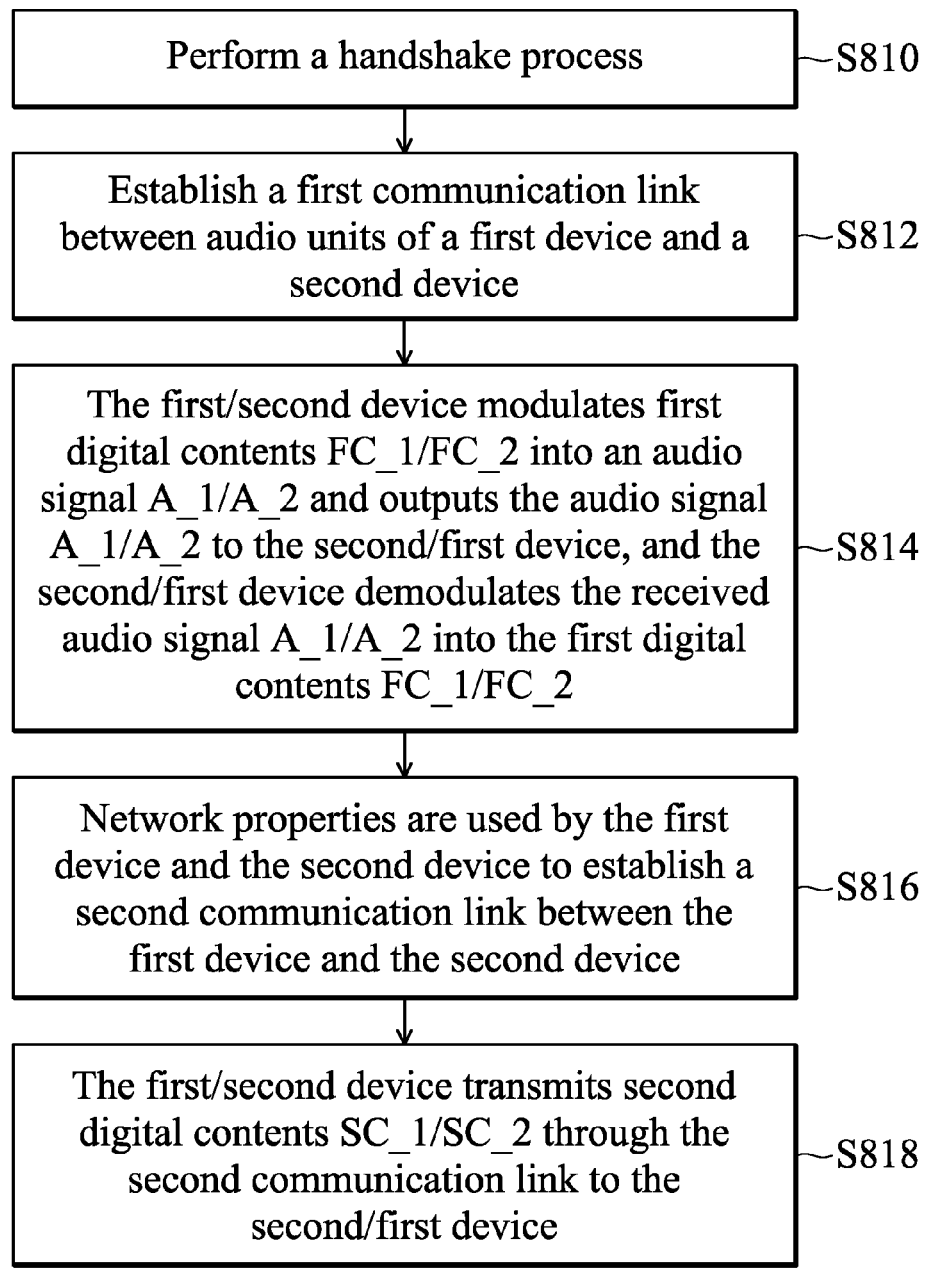
FIG. 8 illustrates a flowchart of exchanging digital contents between devices.

FIG. 8 illustrates a flowchart of exchanging digital contents between devices. In step S810, a handshake process is performed between two devices. Handshake information is transferred between the devices to establish a master/slave relationship. During the handshake process, one of the devices is determined as a master device and the other device is determined as a slave device. In this embodiment, a first device is determined as the master device and a second device is determined as the slave device. The handshake information may include properties such as device identifiers and connectivity information that may be used to connect the devices. After the handshake process is performed, in step S812, a first communication link is established between an audio unit of the first device and an audio unit of the second device.

In step S814, the first device and the second device exchange their first digital contents. The first device modulates first digital contents FC_1 into an audio signal A_1 and outputs the audio signal A_1 by at least one audio generator, such as a speaker, of the audio unit of the first device. The audio signal A_1 may be a continuous audio signal or combinations of audio signals. A range of frequencies of the audio signal A_1 may be out of the hearing range of humans. The at least one audio generator of the first device may output the audio signal A_1 alone or with an audio file, such as a song. The audio signal A_1 is received by at least one audio receiver, such as a microphone, of the audio unit of the second device. Similarly, the second device modulates first digital contents FC_2 into an audio signal A_2 and outputs the audio signal A_2 by at least one audio generator, such as a speaker, of the audio unit of the second device. The audio signal A_2 may be a continuous audio signal or combinations of audio signals. A range of frequencies of the audio signal A_2 may be out of the hearing range of humans. The at least one audio generator of the second device may output the audio signal A_2 alone or with an audio file, such as a song. The audio signal A_2 is received by at least one audio receiver, such as a microphone, of the audio unit of the first device. The second device demodulates the received audio signal A_1 into the first digital contents FC_1. The first device demodulates the received audio signal A_2 into the first digital contents FC_2. The first digital contents FC_1 may include basic contact information of a user of the first device, indexes of second digital contents SC_1, network properties or any combination thereof. The first digital contents FC_2 may contain basic contact information of a user of the second device, indexes of second digital contents SC_2, network properties or any combination thereof.

In one example, the first device outputs the audio signal A_1 to the second device first. After receiving the audio signal A_1, the second device outputs the audio signal A_2 to the first device. In another example, the second device outputs the audio signal A_2 when the first device outputs the audio signal A_1, wherein the first device and the second device use different frequencies to output the audio signal A_1 and the audio signal A_2. For example, the first device uses at least one frequency in a first frequency range to output the audio signal A_1, and the second device uses at least one frequency in a second frequency range to output the audio signal A_2, wherein the first frequency range and the second frequency range are not overlapped with each other. The first device uses the at least one frequency in the second frequency range to receive the audio signal A_2, and the second device uses the at least one frequency in the first frequency range to receive the audio signal A_1. Frequencies used by the first device and the second device can be decided during the handshake process.

In step S816, the network properties are used by the first device and the second device to establish a second communication link between the first device and the second device. In step S818, the first device transmits the second digital contents SC_1 through the second communication link to the second device. The second device transmits the second digital contents SC_2 through the second communication link to the first device. The second digital contents SC_1 and SC_2 may include images, detailed contact information, video files, audio files, appointment information or any combination thereof of the user of the first device and the user of the second device, respectively.

3.4 Fourth Embodiment

Figure 9:
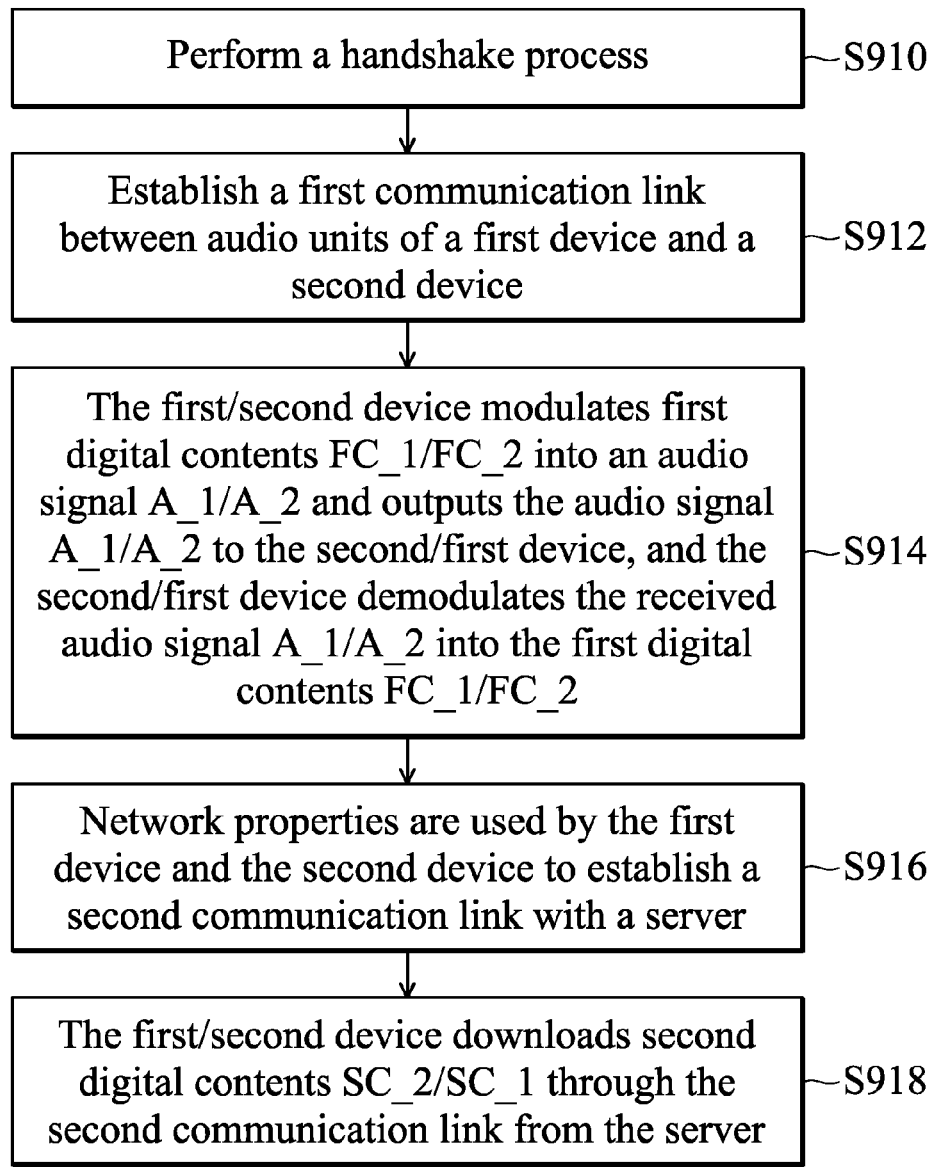
FIG. 9 illustrates a flowchart of exchanging digital contents.

FIG. 9 illustrates a flowchart of exchanging digital contents. In step S910, a handshake process is performed between two devices. Handshake information is transferred between the devices to establish a master/slave relationship. During the handshake process, one of the devices is determined as a master device and the other device is determined as a slave device. In this embodiment, a first device is determined as the master device and a second device is determined as the slave device. The handshake information may include properties such as device identifiers and connectivity information that may be used to connect the devices. After the handshake process is performed, in step S912, a first communication link is established between an audio unit of the first device and an audio unit of the second device.

In step S914, the first device and the second device exchange their first digital contents. The first device modulates first digital contents FC_1 into an audio signal A_1 and outputs the audio signal A_1 by at least one audio generator, such as a speaker, of the audio unit of the first device. The audio signal A_1 may be a continuous audio signal or combinations of audio signals. A range of frequencies of the audio signal A_1 may be out of the hearing range of humans. The at least one audio generator of the first device may output the audio signal A_1 alone or with an audio file, such as a song. The audio signal A_1 is received by at least one audio receiver, such as a microphone, of the audio unit of the second device. Similarly, the second device modulates first digital contents FC_2 into an audio signal A_2 and outputs the audio signal A_2 by at least one audio generator, such as a speaker, of the audio unit of the second device. The audio signal A_2 may be a continuous audio signal or combinations of audio signals. A range of frequencies of the audio signal A_2 may be out of the hearing range of humans. The at least one audio generator of the first device may output the audio signal A_2 alone or with an audio file, such as a song. The audio signal A_2 is received by at least one audio receiver, such as a microphone, of the audio unit of the first device. The second device demodulates the received audio signal A_1 into the first digital contents FC_1. The first device demodulates the received audio signal A_2 into the first digital contents FC_2. The first digital contents FC_1 may include basic contact information of a user of the first device, indexes of second digital contents SC_1, network properties or any combination thereof. The first digital contents FC_2 may include basic contact information of a user of the second device, indexes of second digital contents SC_2, network properties or any combination thereof.

In one example, the first device outputs the audio signal A_1 to the second device first. After receiving the audio signal A_1, the second device outputs the audio signal A_2 to the first device. In another example, the second device outputs the audio signal A_2 when the first device outputs the audio signal A_1, wherein the first device and the second device use different frequencies to output the audio signal A_1 and the audio signal A_2. For example, the first device uses at least one frequency in a first frequency range to output the audio signal A_1, and the second device uses at least one frequency in a second frequency range to output the audio signal A_2, wherein the first frequency range and the second frequency range are not overlapped with each other. The first device uses the at least one frequency in the second frequency range to receive the audio signal A_2, and the second device uses the at least one frequency in the first frequency range to receive the audio signal A_1. Frequencies used by the first device and the second device can be decided during the handshake process.

In step S916, the network properties are used by the first device and the second device to establish a second communication link with a server, onto which the first device and the second device uploads the second digital contents SC_1 and SC_2, respectively. Then in step S918, the second device downloads the second digital contents SC_1 according to the indexes of the second digital contents SC_1 through the second communication link from the server. And the first device downloads the second digital contents SC_2 according to the indexes of the second digital contents SC_2 through the second communication link from the server. The second digital contents SC_1 and SC_2 may include images, detailed contact information, video files, audio files, appointment information or any combination thereof of the user of the first device and the user of the second device, respectively.

Methods and systems of the present disclosure, or certain aspects or portions of embodiments thereof, may take the form of a program code (i.e., instructions) embodied in non-transitory machine-readable media, such as floppy diskettes, CD-ROMS, flash, hard drives, firmware, or any other machine-readable storage medium, wherein, when the program code is loaded into and executed by a machine, such as a computer or a processor, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

One such embodiment comprises a computer program product embodied in a non-transitory machine-readable medium, such as a compact disc (CD), a diskette, a tape, or any other machine-readable storage device, wherein when the computer program product is loaded into and executed by an electronic device, such as a computer, the electronic device performs a method for transmitting digital contents. The method for transmitting digital contents comprises: modulating first digital contents into an audio signal, wherein the first digital contents include contact information and at least one index of at least one second digital content; outputting the audio signal by at least one audio generator of the electronic device; and making at least one receiving electronic device obtain the at least one second digital content through a wired or wireless communication. In one example, the at least one receiving electronic device obtains the at least one second digital content from the electronic apparatus. In another example, the at least one receiving electronic device obtains the at least one second digital content from a server.

One such embodiment comprises a computer program product embodied in a non-transitory computer readable medium, such as a compact disc (CD), a diskette, a tape, or any other computer readable storage device, wherein when the computer program product is loaded into and executed by an electronic device, the electronic device performs a method for receiving digital contents. The method for receiving digital contents comprises: receiving an audio signal by at least one audio receiver of the electronic device; demodulating the audio signal into first digital contents, wherein the first digital contents include contact information and at least one index of at least one second digital content; and obtaining the at least one second digital content according to the at least one index of the at least one second digital content through a wired or wireless communication. In one example, the electronic device obtains the at least one second digital content from the transmitting electronic device. In another example, the electronic device obtains the at least one second digital content from a server.

The first device described above may be in a form of an apparatus for transmitting digital contents, comprising: a modulate unit for modulating first digital contents into an audio signal, wherein the first digital contents include contact information and indexes of second digital contents; an audio unit, including at least one audio generator for outputting the audio signal, such as the speaker 116 in FIG. 1; and a communication unit. In one example, the communication unit transmits the at least one second digital contents to at least one receiving apparatus through a wired or wireless communication, In another example, the communication unit uploads the at least one second digital content onto a server, and at least one receiving apparatus downloads the at least one second digital content from the server. The at least one audio generator of the apparatus outputs the audio signal alone or with an audio file, such as a song.

The second device described above may be in a form of an apparatus for receiving digital contents, comprising: an audio unit, including at least one audio receiver such as the microphone 118 in FIG. 1, for receiving an audio signal transmitted by a transmitting apparatus; a demodulate unit for demodulating the audio signal into first digital contents, wherein the first digital contents include contact information and indexes of second digital contents; and a communication unit for obtaining the second digital contents according to the indexes of the second digital contents through a wired or wireless communication. The audio signal is a continuous audio signal or a combination of audio signals. In one example, the communication unit obtains the at least one second digital content from the transmitting apparatus. In another example, the communication unit obtains the at least one second digital content from a server.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for transmitting digital contents between devices, comprising:
   establishing a first communication link directly between at least one speaker of a first device and at least one microphone of a second device;
   modulating first digital contents into a first audio signal in the first device, wherein the first digital contents include first contact information, network properties and at least one index of at least one second digital content comprising an image file, video file, audio file, multimedia file or any combination thereof;
   outputting the first audio signal by the at least one speaker of the first device;
   receiving the first audio signal by the at least one microphone of the second device;
   demodulating the first audio signal in the second device to make the second device obtain the first digital contents;
   establishing a second communication link between the first device and the second device according to the network properties, wherein the first communication link and the second communication link are of different type; and
   making the second device obtain the at least one second digital content according to the at least one index of the at least one second digital contents from the first device through the second communication link.

2. The method as claimed in claim 1, further comprising:
   modulating third digital contents into a second audio signal in the second device, wherein the third digital contents include second contact information and at least one index of at least one fourth digital content;
   outputting the second audio signal by at least one speaker of the second device;
   receiving the second audio signal by at least one microphone of the first device;
   demodulating the second audio signal in the first device to make the first device obtain the third digital contents; and making the first device obtain the at least one fourth digital content according to the at least one index of the at least one fourth digital content through a second wired or wireless communication.

3. A method for transmitting digital contents between devices, comprising:
establishing a first communication link directly between at least one speaker of a first device and at least one microphone of a second device;
modulating first digital contents into a first audio signal in the first device, wherein the first digital contents include first contact information, network properties and at least one index of at least one second digital content comprising an image file, video file, audio file, multimedia file or any combination thereof;
outputting the first audio signal by the at least one speaker of the first device;
receiving the first audio signal by the at least one microphone of the second device;
demodulating the first audio signal in the second device to make the second device obtain the first digital contents;
establishing a second communication link between the second device and a server according to the network properties, wherein the first communication link and the second communication link are of different type;
making the second device download the at least one second digital content according to the at least one index of at least one second digital content from a server via the second communication link; and
storing the at least one second digital content on the second device.

4. The method as claimed in claim 3, further comprising:
granting the second device an access to the at least one second digital content on a server.

5. The method as claimed in claim 1, wherein the first audio signal is a continuous audio signal or a combination of audio signals.

6. The method as claimed in claim 1, wherein the first digital contents further comprises a link key and/or a password, and the second device is linked to the first device or a server according to the link key and/or the password through the first wired or wireless communication.

7. The method as claimed in claim 6, wherein the link key is an identification key to a Bluetooth device, a wireless network or a wired network.

8. The method as claimed in claim 1, wherein the at least one speaker of the first device outputs the first audio signal with an audio file.

9. An apparatus for transmitting digital contents, comprising:
a modulate unit for modulating first digital contents into an audio signal, wherein the first digital contents include contact information, network properties and at least one index of at least one second digital content comprising an image file, video file, audio file, multimedia file or any combination thereof;
an audio unit, including at least one speaker for outputting the audio signal; and
a communication unit to establish a first communication link directly between the at least one speaker and at least one microphone of a receiving apparatus, and to establish a second communication link according to the network properties and transmit the at least one second digital content according to the at least one index of at least one second digital content to the receiving apparatus through the second communication link, or upload the at least one second digital content onto a server from which the receiving apparatus downloads the at least one second digital content according to the at least one index of at least one second digital content through the second communication link, wherein the first communication link and the second communication link are of different type.

10. The apparatus as claimed in claim 9, wherein a handshake process is performed between the apparatus and the receiving apparatus.

11. The apparatus as claimed in claim 9, wherein the audio signal is a continuous audio signal or a combination of audio signals.

12. The apparatus as claimed in claim 9, wherein the at least one speaker of the apparatus outputs the audio signal with an audio file.

13. An apparatus for receiving digital contents, comprising:
an audio unit, including at least one microphone for receiving an audio signal transmitted by a transmitting apparatus;
a demodulate unit for demodulating the audio signal into first digital contents, wherein the first digital contents include contact information, network properties and at least one index of at least one second digital content comprising an image file, video file, audio file, multimedia file or any combination thereof; and
a communication unit to establish a first communication link directly between the at least one microphone and at least one speaker of the transmitting apparatus, to establish a second communication link between the apparatus and the transmitting apparatus according to the network properties, to obtain the at least one second digital content according to the at least one index of the at least one second digital content through the second communication link, and to store the at least one second digital content on the apparatus, wherein the first communication link and the second communication link are of different type.

14. The apparatus as claimed in claim 13, wherein the communication unit obtains the at least one second digital content from the transmitting apparatus.

15. The apparatus as claimed in claim 13, wherein the communication unit obtains the at least one second digital content from a server.

16. The apparatus as claimed in claim 13, wherein a handshake process is performed between the apparatus and the transmitting apparatus.

17. The apparatus as claimed in claim 13, wherein the audio signal is a continuous audio signal or a combination of audio signals.

18. A computer program product embodied in a non-transitory computer readable medium, wherein when the computer program product is loaded into and executed by an electronic device, the electronic device performs a method for transmitting digital contents, comprising:
establishing a first communication link directly between at least one speaker of the electronic device and at least one microphone of a receiving electronic device;
modulating first digital contents into an audio signal, wherein the first digital contents include contact information, network properties and at least one index of at least one second digital content comprising an image file, video file, audio file, multimedia file or any combination thereof;
outputting the audio signal by the at least one speaker of the electronic device;

establishing a second communication link according to the network properties, wherein the first communication link and the second communication link are of different type; and making the at least one receiving electronic device obtain the at least one second digital content according to the at least one index of at least one second digital content through the second communication link.

19. The computer program product as claimed in claim 18, wherein the at least one receiving electronic device obtains the at least one second digital content from the electronic apparatus.

20. The computer program product as claimed in claim 18, wherein the at least one receiving electronic device obtains the at least one second digital content from a server.

21. A computer program product embodied in a non-transitory computer readable medium, wherein when the computer program product is loaded into and executed by an electronic device, the electronic device performs a method for receiving digital contents, comprising:

establishing a first communication link directly between at least one speaker of a transmitting electronic device and at least one microphone of the electronic device;

receiving an audio signal by the at least one microphone of the electronic device;

demodulating the audio signal into first digital contents, wherein the first digital contents include contact information, network properties and at least one index of at least one second digital content comprising an image file, video file, audio file, multimedia file or any combination thereof;

establishing a second communication link according to the network properties, wherein the first communication link and the second communication link are of different type;

obtaining the at least one second digital content according to the at least one index of the at least one second digital content through the second communication link; and storing the at least one second digital content on the electronic device.

22. The computer program product as claimed in claim 21, wherein the electronic device obtains the at least one second digital content from the transmitting electronic device.

23. The computer program product as claimed in claim 21, wherein the electronic device obtains the at least one second digital content from a server.

24. The method as claimed in claim 1, wherein before modulating first digital contents into the first audio signal in the first device, the method further comprises:

emitting a ping message by the first device to find devices; and responding with an acknowledgment message by the second device.

25. The method as claimed in claim 3, further comprising:

modulating third digital contents into a second audio signal in the second device, wherein the third digital contents include second contact information and at least one index of at least one fourth digital content;

outputting the second audio signal by at least one speaker of the second device;

receiving the second audio signal by at least one microphone of the first device;

demodulating the second audio signal in the first device to make the first device obtain the third digital contents; and making the first device obtain the at least one fourth digital content according to the at least one index of the at least one fourth digital content through a second wired or wireless communication.

26. The method as claimed in claim 3, wherein the first digital contents further comprises a link key and/or a password, and the second device is linked to the first device or a server according to the link key and/or the password through the first wired or wireless communication.

27. The method as claimed in claim 3, wherein the first audio signal is a continuous audio signal or a combination of audio signals.

28. A method, executed by a first device, for transmitting digital contents between the first device and a second device, comprising:

executing a handshake procedure between the first device and the second device, wherein a handshake information is transmitted during the handshake procedure;

establishing a first communication link directly between at least one speaker of the first device and at least one microphone of the second device according to an audio communication mechanism;

modulating first digital contents into a first audio signal in the first device, wherein the first digital contents include first contact information, network properties and at least one index of at least one second digital content comprising an image file, video file, audio file, multimedia file or any combination thereof;

outputting the first audio signal by the at least one speaker of the first device to at least one microphone of the second device;

establishing a second communication link between the first device and the second device according to the network properties, wherein the first communication link and the second communication link are of different type; and making the second device obtain the at least one second digital content according to the at least one index of the at least one second digital contents from the first device through the second communication link.

* * * * *